United States Patent
Laman et al.

(10) Patent No.: US 7,616,342 B2
(45) Date of Patent: Nov. 10, 2009

(54) MECHANISM FOR ALLOWING CONTENT-INDEPENDENT IMAGING DATE STREAM OBJECT USAGE

(75) Inventors: Robert R. Laman, Rancho Palos Verdes, CA (US); Thomas E. Horton, Torrance, CA (US); Mark A. Gaines, Hawthorne, CA (US); Steven F. Livengood, Laguna Niguel, CA (US)

(73) Assignee: Xerox Corporation, Norwalk, CT (US)

( * ) Notice: Subject to any disclaimer, the term of this patent is extended or adjusted under 35 U.S.C. 154(b) by 914 days.

(21) Appl. No.: 11/003,860

(22) Filed: Dec. 3, 2004

(65) Prior Publication Data

US 2006/0119869 A1   Jun. 8, 2006

(51) Int. Cl.
    G06F 15/00 (2006.01)
    G06K 1/00 (2006.01)
(52) U.S. Cl. .................. 358/1.9; 358/1.1; 358/1.13; 358/1.15
(58) Field of Classification Search .......... 358/1.9, 358/1.15, 1.1, 1.13–1.18; 709/231; 715/700–867
    See application file for complete search history.

(56) References Cited

U.S. PATENT DOCUMENTS

| | | | |
|---|---|---|---|
| 5,134,493 A | 7/1992 | Laman et al. | 358/296 |
| 5,153,739 A | 10/1992 | Laman et al. | 358/300 |
| 5,237,517 A | 8/1993 | Harrington et al. | 364/526 |
| 5,471,324 A | 11/1995 | Rolleston | 358/518 |
| 5,588,093 A | 12/1996 | Harrington | 395/109 |
| 5,813,020 A * | 9/1998 | Hohensee et al. | 715/234 |
| 5,880,738 A | 3/1999 | Donelly | 345/431 |
| 5,953,506 A * | 9/1999 | Kalra et al. | 709/231 |
| 6,115,493 A | 9/2000 | Harrington | 382/162 |
| 6,426,802 B1 | 7/2002 | Lin | 358/1.9 |
| 6,529,856 B1 * | 3/2003 | Fischer et al. | 702/186 |
| 6,535,205 B2 * | 3/2003 | Kadota | 345/173 |
| 6,535,209 B1 | 3/2003 | Abdalla et al. | 345/418 |
| 6,594,388 B1 | 7/2003 | Gindele et al. | 382/167 |
| 6,721,069 B1 | 4/2004 | Harrington | 358/3.2 |
| 6,760,123 B1 | 7/2004 | Harrington et al. | 358/1.9 |
| 6,894,797 B1 * | 5/2005 | Hayes et al. | 358/1.15 |
| 6,992,785 B1 * | 1/2006 | Chatcavage et al. | 358/1.15 |

(Continued)

Primary Examiner—Twyler L Haskins
Assistant Examiner—Dennis Dicker
(74) Attorney, Agent, or Firm—Kermit D. Lopez; Luis M. Ortiz; Tuesday A. Kaasch (57) ABSTRACT

An imaging data stream language, such as, but not limited to an LCDS language can be provided such that a plurality of objects to be rendered are divided into a plurality of categories, wherein each object among the plurality of objects are utilized in association with a plurality of callouts. Each object among the group of objects can be processed separately via a processor from each callout among the plurality of callouts, thereby permitting any of the objects among the plurality of objects to be utilized with any callout among the plurality of callouts in order to efficiently render the plurality of objects utilizing the imaging data stream language. In general, one or more objects can be processed independently of each callout among the plurality of callouts in order to determine a plurality of standard attributes thereof, wherein the plurality of attributes are determined based on at least one object type. Additionally, one or more standard attributes among the plurality of attributes can include, for example, but not limited, the natural size or natural orientation of the object type.

22 Claims, 5 Drawing Sheets

U.S. PATENT DOCUMENTS

| | | |
|---|---|---|
| 7,430,063 B2 * | 9/2008 | Aschenbrenner et al. ..... 358/1.9 |
| 2004/0156075 A1 * | 8/2004 | Hohensee et al. .......... 358/1.15 |
| 2004/0184074 A2 * | 9/2004 | Leiman et al. ............. 358/1.15 |
| 2006/0136442 A1 * | 6/2006 | La Rosa Ducato et al. .. 707/101 |

* cited by examiner

MECHANISM FOR ALLOWING CONTENT-INDEPENDENT IMAGING DATE STREAM OBJECT USAGE

TECHNICAL FIELD

Embodiments are generally related to printing methods and systems. Embodiments are also related to imaging data streams and color imaging models thereof. Embodiments are additionally related to data streams for imaging via document rendering systems.

BACKGROUND OF THE INVENTION

Digital printing systems can be constructed from two essential components. The first component is a print engine and the second component is a print controller. The print engine and controller units can be developed and implemented independently of one another, or integrated into the product that is ultimately manufactured. In general, the print controller handles communications and interfaces with a host system.

A print controller can also interpret print commands transmitted from the host and translate them into signals required to drive the print engine. Printing functions ranging from color management to duplexing generally depend on the interaction of the print engine and the controller. Digital print systems include, for example, desktop units, copy machines, printers, print-on-demand systems, and so forth.

One of the functions of a print controller is the ability to effectively enable a print stream format. A number of different print stream formats are utilized in the printing arts. A commonly utilized print stream format (also referred to herein as an "imaging data stream") is the Line Conditioned Data Stream (LCDS), developed by Xerox Corporation of Stamford, Conn. LCDS is one type of an imaging data stream that can be utilized to drive, for example production printers. Unlike page description languages, which create pages from high-level graphical constructs, print command languages such as LCDS contain printer commands interspersed with data and are processed and executed sequentially.

Currently, printers implementing the LCDS printing language restrict the types of LCDS objects that can be referenced by LCDS commands. For example, LCDS forms can only be utilized in a FORM callout, images in an IMAGE callout, and so forth. A user wishing to reference an object without a callout other than its native callout must utilize offline tools to convert the object to the correct format, which is frequently a laborious, time consuming manual process. A need therefore exists for providing a mechanism and a methodology for an imaging data stream implementation, such as, but not limited to LCDS that allows any object content type to be utilized in any callout without reverting to manual conversion. Such a goal can be accomplished through the application of the imaging methods and systems, which are disclosed in further detail herein with respect to particular embodiments.

BRIEF SUMMARY

It is one feature of the embodiments disclosed herein to provide improved printing methods and systems.

It is another feature of the embodiments disclosed herein to provide an improved imaging data stream, including methods and systems thereof.

It is a further feature of the embodiments disclosed herein to provide improved Line Conditioned Data Stream (LCDS) methods and systems.

It is an additional feature of the embodiments disclosed herein to provide methods and systems for allowing content-independent LCDS object usage.

Aspects of the present invention relate to methods and systems in a printer output device for allowing content-independent imaging data stream object usage. An imaging data stream language, such as, but not limited to an LCDS language can be provided such that a plurality of objects to be rendered are divided into a plurality of categories, wherein each object among the plurality of objects are utilized in association with a plurality of callouts. Each object among the group of objects can be processed separately via a processor from each callout among the plurality of callouts, thereby permitting any of the objects among the plurality of objects to be utilized with any callout among the plurality of callouts in order to efficiently render the plurality of objects utilizing the imaging data stream language.

One or more objects can be processed independently of each callout among the plurality of callouts in order to determine a plurality of standard attributes thereof, wherein the plurality of attributes are determined based on at least one object type. Additionally, one or more standard attributes among the plurality of attributes can include, for example, but not limited to, the natural size or natural orientation of the object type. Each callout among the plurality of callouts can be processed separately from each object among the plurality of objects utilizing the plurality of attributes associated with an object among the plurality of objects in order to determine place and size data for each callout thereof. A callout can be, for example, a form callout, an image callout and/or a logo callout. The imaging data stream language can be, for example, the Line Conditioned Data Stream (LCDS) language. The object itself can be rendered via an electronic document processing system that comprises, for example, one or more computer workstations associated with one or more rendering devices utilizing a computer network.

BRIEF DESCRIPTION OF THE DRAWINGS

The particular values and configurations discussed in these non-limiting examples can be varied and are cited merely to illustrate one or more embodiments and are not intended to limit the scope thereof.

DETAILED DESCRIPTION

The particular values and configurations discussed in these non-limiting examples can be varied and are cited merely to illustrate embodiments and are not intended to limit the scope of the invention.

The embodiments discussed herein can be implemented in the context of imaging data streams. An example of an imaging data stream is the Line Conditioned Data Stream (LCDS), which is a line data stream utilized to drive Xerox Corporation's production printers from host systems. Unlike page description languages, which create pages from high-level graphical constructs, print command languages such as LCDS contain printer commands interspersed with data and are processed and executed sequentially.

The methods and systems described herein generally permit the definition of a mechanism for an LCDS implementation that allows any LCDS object content type to be utilized in any callout without the necessity of a manual conversion step. Such a mechanism, including associated methodologies, can provide for independent processing of the content type and the callout. Such a mechanism is compatible with existing algorithms when the content type matches the callout. In the manner, any LCDS object of any content type can be utilized in any callout automatically without manual conversion by the job creator, while maintaining compatible behavior.

Figure 1:
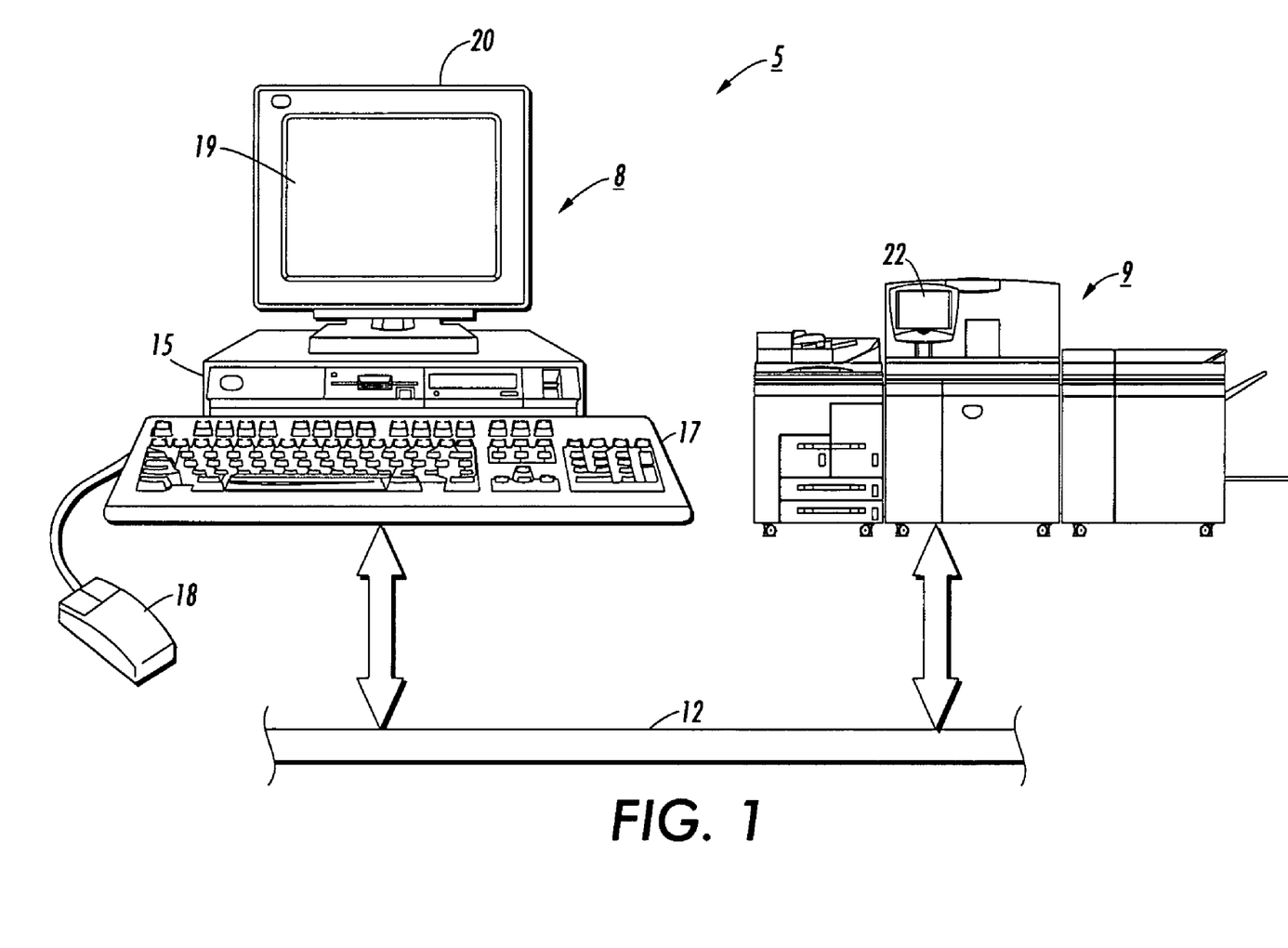
FIG. 1 illustrates a schematic elevational view depicting one example of components of an electronic document processing system with a printing machine adapted to print electronically encoded documents transmitted from a computer workstation, in which one embodiment can be implemented.

With reference now to the drawings where the showings are for the purpose of illustrating a preferred embodiment of the invention and not for limiting same, FIG. 1 shows electronic document processing system 5 incorporating the present invention. The embodiments disclosed herein can therefore be implemented in the context of system 5 depicted in FIG. 1. In general, the electronic document processing system 5 includes a computer workstation 8 and a printing system 9 that are connected with a suitable communication channel such as EtherNet® connection 12. The connection 12 enables image data from one or more remote sources such as workstation 8, to be input to the printing system 9 for hardcopy rendering. The workstation 8 includes a computer system 15 for processing user inputs received from keyboard 17 and pointing device or mouse 18, through user interface 19 displayed on monitor 20. The user interface 19 collectively represents user inputs through which control instructions are used to develop electronic images. The printing system 9, which has its own user interface 22 for monitoring print job requests, can be adapted to print hardcopy color and/or black and white image renderings of selected electronic images developed on workstation 8.

Figure 2:
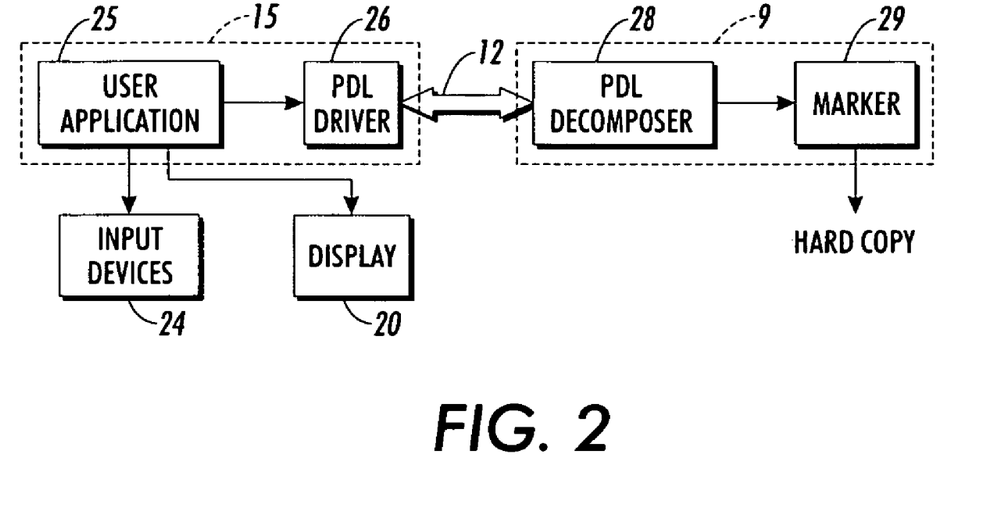
FIG. 2 illustrates a block diagram representing the basic elements of the electronic processing system depicted in FIG. 1, which can be implemented in accordance with an embodiment.

FIG. 2 illustrates a block diagram representing the basic elements of the electronic processing system 5 shown in FIG. 1, which can be implemented in accordance with an embodiment. In particular, the computer system 15 of workstation 8 executes a conventional graphical user application 25. User application 25 provides a high level, device independent graphics software environment for creating, editing and viewing high quality electronic images using two dimensional image elements. Examples of image elements are text in various fonts, lines and curves of various thicknesses, strokes or enclosed outlines and sampled images, all of which can be depicted using various colors that are represented by color reference models as disclosed, for example, in the Xerox Color Encoding Standard.

Image elements are typically a high level description of pixels (picture elements), and unlike pixels, image elements are inherently device independent and are therefore readily transferable between various input and output devices. Additionally, the user application 25 can scale, rotate, translate and clip image elements by specifying an image transformation along with an element. The device independent specification of electronic images by application 25 enables electronic images specified in this manner to be rendered on a variety of output devices such as printing system 9.

More specifically, image elements forming an input image emitted from PDL driver 26 can be defined utilizing high level primitives of a print description language (PDL) In general, a PDL provides a set of commands that are used to describe various graphic and textual elements forming an image to be printed. For example, a PDL can describe a rectangle in an image by indicating coordinates of its corners, the thickness of its edges, its fill pattern, its color as well as other attributes. The PDL can also be used to include in the input image a raster image or a reference to one or more raster images. The high level primitives describing the input image form a PDL stream of data that is rendered to lower level primitives such as pixels. Each pixel corresponds to a spot which is subsequently marked using an image output terminal such as printing system 9 to form a reproduction of the input image.

Selected input images which are stored in the memory (not shown) of workstation 8 and described using a PDL by user application 25 are transmitted to printing system 9 using print driver 26. Print driver 26 transfers PDL descriptions of electronic document files selected for printing to printing system 9. Once received and stored in the memory (not shown) of printing system 9, PDL descriptions of electronic documents are processed by PDL decomposer 28. The decomposer 28 produces corresponding bit-mapped image files of PDL descriptions of electronic documents that are subsequently rendered on paper or the like by marker 29. A functional implementation of the PDL decomposer 28, is described in detail in U.S. patent application Ser. No. 07/898,761 entitled "Apparatus and Method for Multi-Stage/Multi-Process Decomposing", filed Jun. 12, 1993, by Bonk et al., the pertinent portions of which are incorporated herein by reference.

The decomposer 28 executes a PDL stream to generate lower level imaging primitives, and in doing this, the decomposer further parses the PDL stream into various image related components that are further processed by decomposer 28 before output to marker 29. The types of operations required to generate image related components include, among others, binding font calls to bitmap or contour fonts, image processing on pictorial information (such as rotating, enlarging and reducing), and/or conveying line art/graphics to lower level primitives.

One example of a PDL that can be adapted for use with the embodiments disclosed herein is an LCDS print description language (PDL), which can be configured as a set of commands that are provided to a printing system such as system 5 depicted in FIG. 1 that defines properties such as the appearance, output destination, and paper feed source for an LCDS print job. An LCDS PDL can accomplish a number of tasks, such as, for example, changing and mixing font types on a page to page, line to line, or character to character basis. A user can therefore customize printed output for specific needs; for example, emphasizing important headings by changing font styles and sizes. Additionally, the use of LCDS PDL permits text orientation and position to be changed on a page to page basis, along with printing a number of previously separate logical pages of a document.

In general, LCDS object references can be divided into three categories. The first category is "Forms", which is based on a FORM callout. The second category is "Logos", which is based on a LOGO callout. The third category is "Images", which is based on an IMAGE callout. Likewise, LCDS objects utilized in the callouts can be divided into the same categories. The first category is "Forms", with an object content defined by an FRM file format. The second category is "Logos", with an object content defined by the an LGO file format. The third category is "Images", with an object defined by an IMG/RES, TIFF, JFIF or JPEG file formats.

Traditional form callouts can only reference form objects, while logo callouts can only reference logo objects. Similarly, image callouts can reference only image objects. Traditional syntax, semantics, and processing algorithms associated with these callouts, along with the conversion of a particular object format into marks on paper, are generally less capable and less efficient processes. The embodiments disclosed herein therefore describe a mechanism for handling these callouts and objects such that any of the objects can be utilized with any of the callouts.

In traditional systems, LCDS users are forced to manually convert object formats in order to utilize a particular object with a callout other than the one associated with the object. For example, a user wishing to utilize an IMG format file in a form callout would be forced to create an FRM object equivalent to the IMG. Additionally, traditional systems implementing LCDS considered the callout and the object as a single processing unit. The embodiments described herein, on the other hand, permit the callout and the object to be considered separately for processing, a process which is much more capable and efficient than the traditional systems described above.

Figure 3:
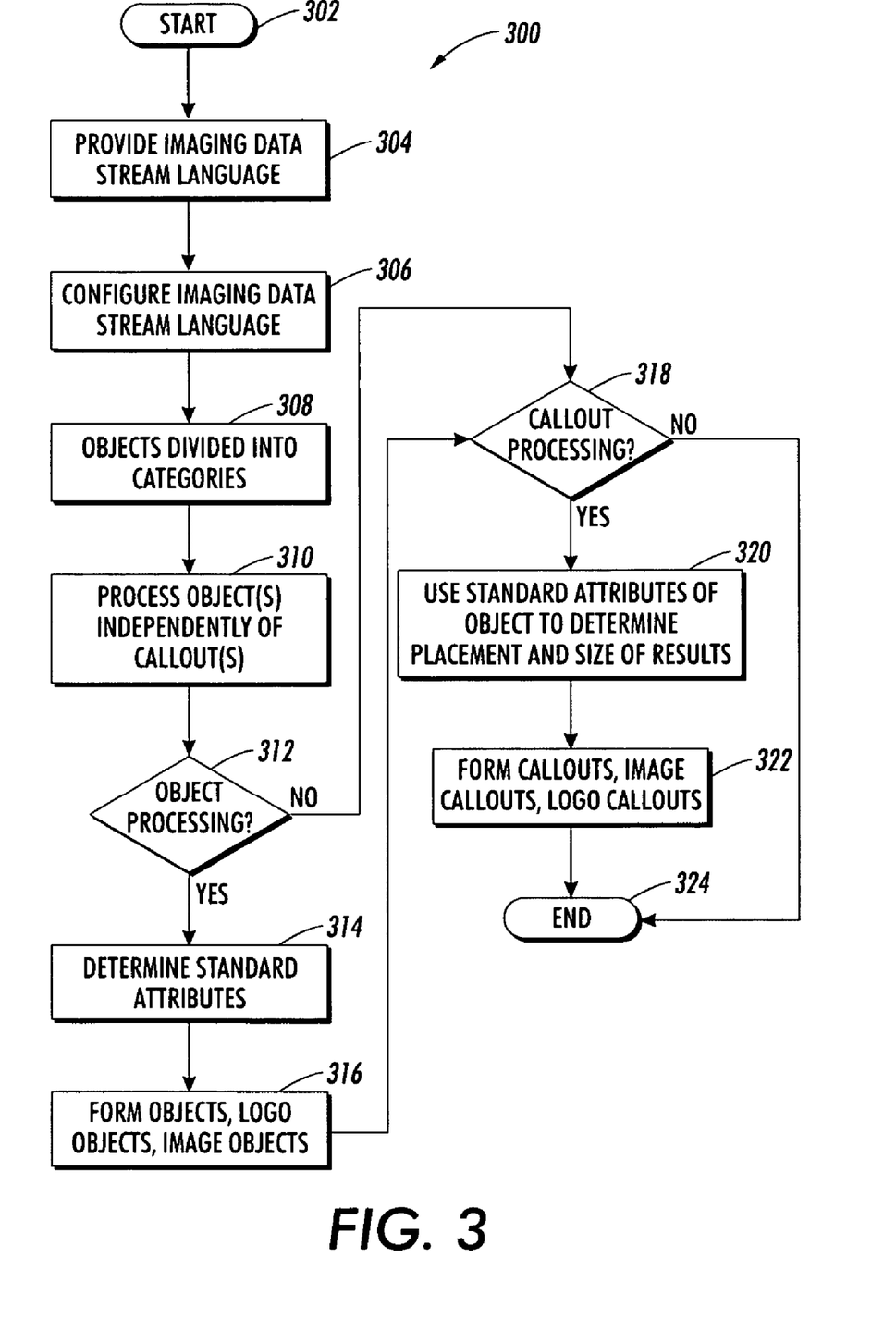
FIG. 3 illustrates a high-level flow chart of operations depicting logical operational steps, which can be implemented in accordance with a preferred embodiment.

FIG. 3 illustrates a high-level flow chart 300 of operations depicting logical operational steps, which can be implemented in accordance with a preferred embodiment. As depicted at block 302, the process can be initiated. Thereafter, as illustrated at block 304, an imaging data stream language (e.g., LCDS) can be provided. Thereafter, as indicated at block 306, the imaging data stream language is configured such that a plurality of objects to be rendered are divided into a plurality of categories as depicted next at block 308. Each object among said plurality of objects can be utilized in association with a plurality of callouts. Next, as indicated at block 310, a process is initiated in which each object among the plurality of objects are processed separately from each callout among said plurality of callouts, thereby permitting any of said objects among said plurality of objects to be utilized with any callout among said plurality of callouts in order to efficiently render said plurality of objects utilizing said imaging data stream language.

Next, as indicated at block 312, a test can be performed to determine if object processing is desired. If so, then the process continues as indicated at block 314. If not, then the test indicated at block 318 is processed. Assuming that the object (s) is processed, the object can be processed independently of the callout in order to determine the object's standard attributes, including the object's natural size and natural orientation. Determining the object's standard attributes begins as depicted at block 314. Such attributes are determined for each object type, as indicated thereafter at block 316. The operation illustrated at block 316 involves form objects, logo objects and image objects. Regarding form objects, the form's natural size can be determined by applying, for example, a media extraction algorithm to the form. The extracted media determines the natural size. The natural orientation remains always "landscape" for form objects.

Regarding logo objects, the logo's natural size and natural orientation can be determined by applying an interpretation algorithm as if the logo were utilized with a Logo Callout placing the logo at absolute 0,0. A bounding box determined utilizing such an algorithm can be used to determine the natural size. The orientation determines the natural orientation. Regarding image objects, the image's natural size and natural orientation can be determined by applying an appropriate interpretation algorithm as if the image were utilized with an image callout placing the image at 0,0 with no rotation, width, nor scaling specified. The bounding box determined by this algorithm determines the natural size, while the orientation determines the natural orientation.

When object processing is complete, a test can be performed, as indicated at block 318 to determine whether to proceed with callout processing operations. If it is determined to proceed with callout processing, then the operation illustrated at block 320. If not, then the process terminates, as indicated at block 324. Assuming that callout processing continues, then the callout is processed independently of the object using the standard attributes of the object to determine the placement and size of the results as depicted at block 320. Note that the syntax and semantics of form, image and logo callouts are not affected by the methods and systems described herein. Processing rules such as ordering and layering of objects references by such callouts are also not affected by the embodiments disclosed herein.

Regarding form callouts, as depicted at block 322, the origin of the object can be placed at the upper-left corner of the page when viewed in a landscape orientation, and the object appears in its natural size and natural orientation. Regarding image callouts, as depicted at block 322, the callout specifies where the origin of the object is placed relative to the page. The callout also specifies a size and orientation that is interpreted relative to the object's natural size and natural orientation. Regarding logo callouts as indicated at block 322, the callout can specify where the origin of the object is to be placed relative to the page or relative to any text thereof. The object appears in its natural size and natural orientation. The process thereafter terminates, as indicated at block 324. Based on the foregoing it can be appreciated that independent processing of the objects and callouts allows any object type to be utilized with any callout.

Embodiments such as the methodology described above can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based.

Thus, for example, the term module, as utilized herein generally refers to software modules or implementations thereof. Such modules can be utilized separately or together to form a program product that can be implemented through signal-bearing media, including transmission media and recordable media. The operations depicted at blocks 302 to 324 in FIG. 3 can therefore be implemented as software modules which are stored in a memory location of a data-processing system and processed via a processor for the rendering of objects, as described above.

Figure 4:
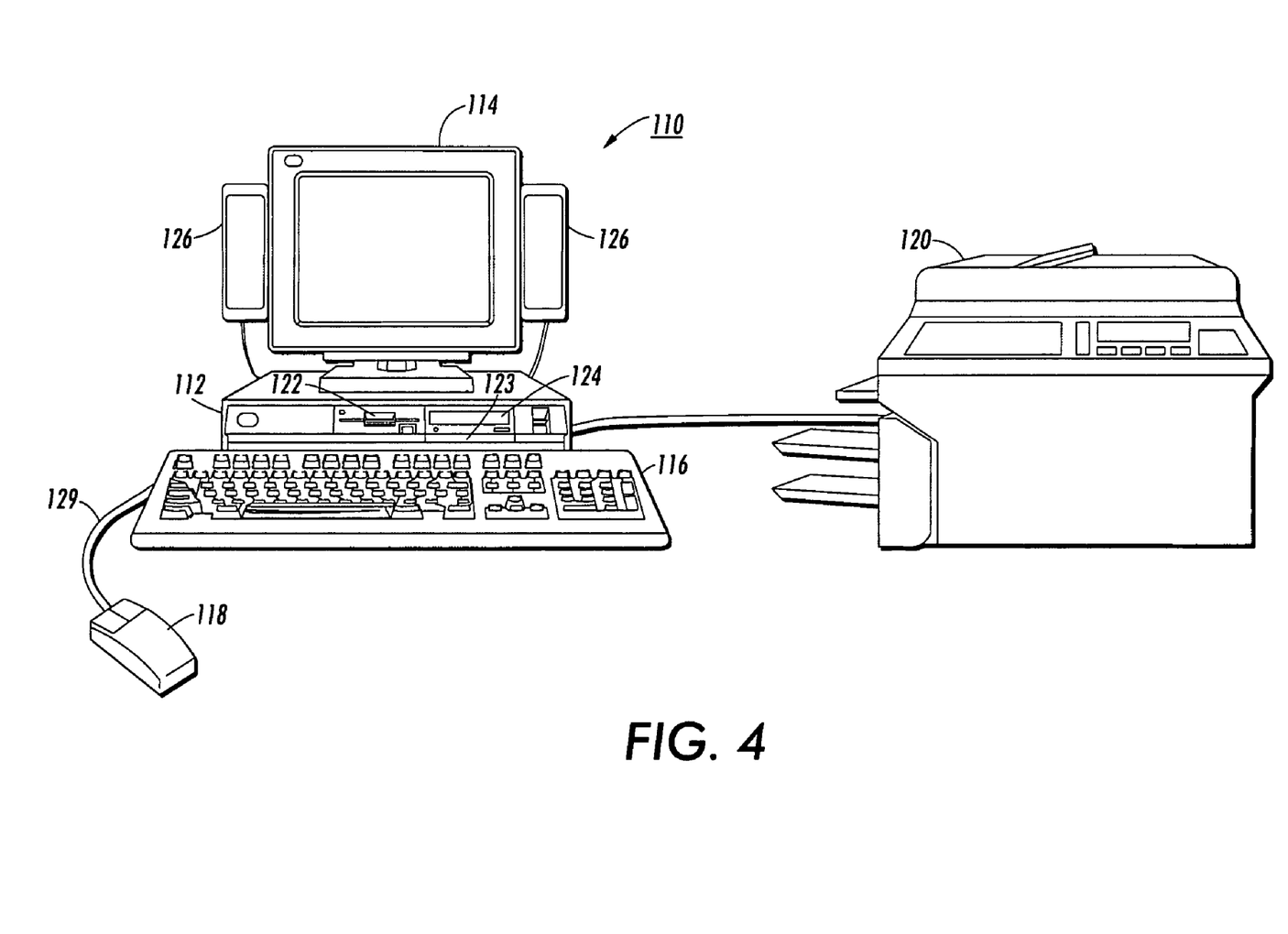
FIG. 4 illustrates a pictorial representation of a computer system in which an embodiment can be implemented.

With reference now to the figures and in particular with reference to FIG. 4, there is depicted an embodiment of a computer system that can be utilized to implement the preferred embodiment. Data-processing system 110 includes processing unit 112, display device 114, keyboard 116, pointing device 118, rendering device 120, and speakers 126. Rendering device 120 can be implemented as a device such as a printer. Processing unit 112 receives input data from input devices such as keyboard 116, pointing device 118, and local area network interfaces (not illustrated) and presents output data to a user via display device 114, printer 120, and speakers 126. Because processing unit 112 can be networked into a computer network, devices such as rendering device 120 can function as a network device such as a network scanner or multifunction device. Data-processing system 110 thus can function not only as a stand-alone desktop personal computer, but can also function as a networked data-processing system with multifunction capabilities such as printing, scanning, copying and so forth.

Keyboard 116 is that part of data-processing system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters and additional keys, such as the "control," "alt," and "shift" keys that can be utilized to change the meaning of another key. Other special keys and combinations of keys can be utilized to control program operations or to move either text or cursor on the display screen of video-display terminal 114.

Video-display terminal 114 is the visual output of data-processing system 110. As indicated herein, video-display terminal 114 can be a cathode-ray tube (CRT) based video display well-known in the art of computer hardware. But, with a portable or notebook-based computer, video-display terminal 114 can be replaced with a liquid crystal display (LCD) based or gas, plasma-based, flat-panel display.

Pointing device 118 is preferably utilized in conjunction with a graphical user-interface (GUI) in which hardware components and software objects are controlled through the selection and the manipulation of associated, graphical objects displayed within display device 114. Although data-processing system 110 is illustrated with a mouse for pointing device 118, other graphical-pointing devices such as a graphic tablet, joystick, track ball, touch pad, or track pad could also be utilized. Pointing device 118 features a casing with a flat bottom that can be gripped by a human hand. Pointing device 118 can include buttons on the top, a multi-directional-detection device such as a ball on the bottom, and cable 129 that connects pointing device 118 to processing unit 112.

To support storage and retrieval of data, processing unit 112 further includes diskette drive 122, hard-disk drive 123, and CD-ROM drive 124, which are interconnected with other components of processing unit 112, and which are further described below under the description for FIG. 5. Data-processing system 110 can be implemented utilizing any suitable computer. But, a preferred embodiment of the present invention can apply to any hardware configuration that allows the display of windows, regardless of whether the computer system is a complicated, multi-user computing apparatus, a single-user workstation, or a network appliance that does not have non-volatile storage of its own.

Figure 5:
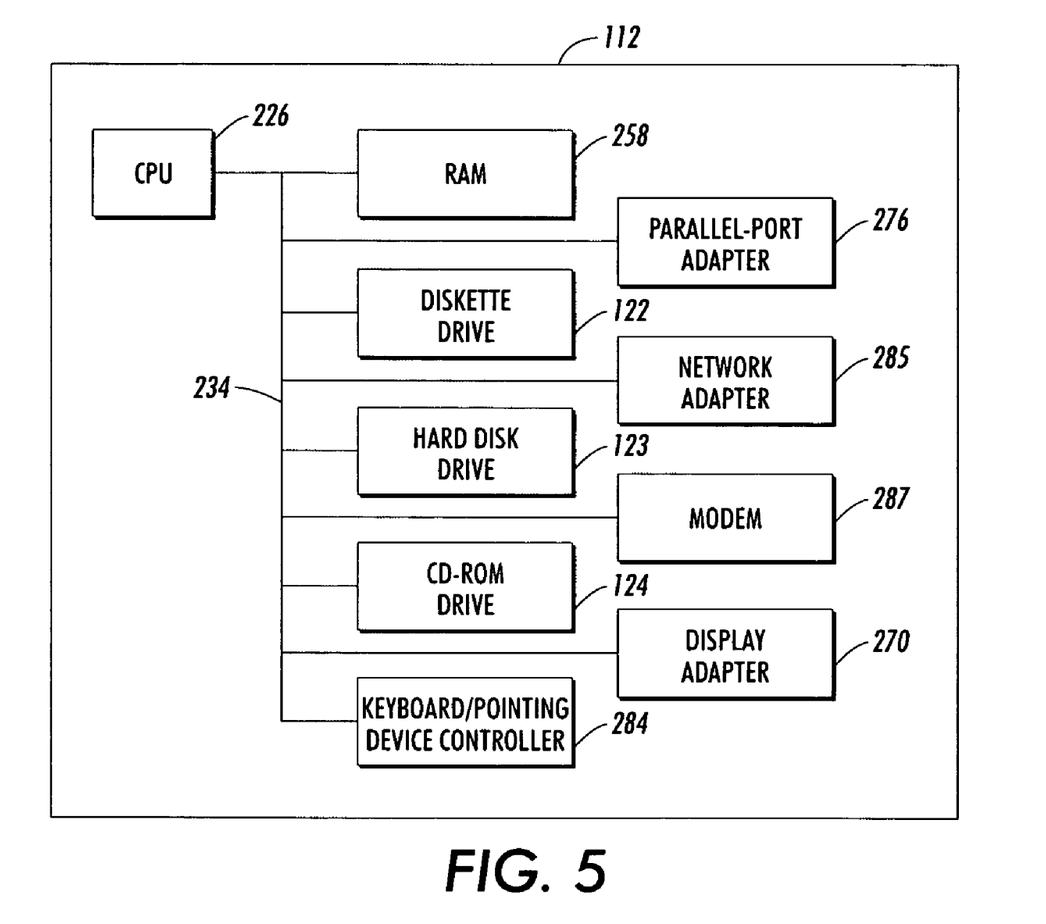
FIG. 5 illustrates a block diagram of a representative hardware environment of the processing unit of the computer system depicted in FIG. 5.

Referring to FIG. 5, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 5 are drawn as single entities, each may consist of a plurality of entities and may exist at multiple levels.

Processing unit 112 includes central processing unit (CPU) 226, which executes instructions. CPU 226 includes the portion of data-processing system 110 that controls the operation of the entire computer system, including executing the arithmetical and logical functions contained in a particular computer program. Although not depicted in FIG. 5, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented, for example, as any one of a number of processor chips, or any other type of processor, which are available from a variety of vendors. Although data-processing system 110 is shown to contain only a single CPU and a single system bus, the present invention applies equally to computer systems that have multiple CPUs and to computer systems that have multiple buses that each performs different functions in different ways.

RAM 258 comprises a number of individual, volatile-memory modules that store segments of operating system and application software while power is supplied to data-processing system 110. The software segments are partitioned into one or more virtual-memory pages that each contains a uniform number of virtual-memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without needing to start from the beginning.

Hard-disk drive 123 and diskette drive 122 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from data-processing system 110.

A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semi permanent basis. Because the magnetic coating of the disk must be protected from damage and contamination, a floppy disk (e.g., 5.25 inch) or micro-floppy disk (e.g., 3.5 inch) is encased in a protective plastic jacket. But, any size of disk could be used. A hard disk, which is very finely machined, is typically enclosed in a rigid case and can be exposed only in a dust free environment. Keyboard/pointing-device controller 284 interfaces processing unit 112 with keyboard 116 and graphical-pointing device 118. In an alternative embodiment, keyboard 116 and graphical-pointing device 118 have separate controllers. Display adapter 270 can translate graphics data from CPU 226 into video signals utilized to drive display device 114.

Finally, processing unit 112 includes network adapter 285, modem 287, and parallel-port adapter 276, which facilitate communication between data-processing system 110 and peripheral devices or other computer systems. Parallel-port adapter 276 transmits printer-control signals to printer 120 through a parallel port. Network adapter 285 connects data-processing system 110 to an un-illustrated local area network (LAN). A LAN provides a user of data-processing system 110 with a means of electronically communicating information, including software, with a remote computer or a network logical-storage device. In addition, a LAN supports distributed processing, which enables data-processing system 110 to share a task with other computer systems linked to the LAN., which can also be implemented in the context of a wireless local area network (WLAN).

Modem 287 supports communication between data-processing system 110 and another computer system over a standard telephone line. Furthermore, through modem 287, data-processing system 110 can access other sources such as a server, an electronic bulletin board, and the Internet or the well-known World Wide Web.

The configuration depicted in FIG. 4 is but one possible implementation of the components depicted in FIG. 5. Portable computers, laptop computers, and network computers or Internet appliances are other possible configurations. The hardware depicted in FIG. 5 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted. Note also that the configuration depicted in FIGS. 4 and 5 is analogous to components depicted in FIG. 1. For example, keyboard 17 depicted in FIG. 1 is similar to keyboard 116 depicted in FIG. 4. Monitor 114 depicted in FIG. 4 is analogous to monitor or display unit 20 depicted in FIG. 1. Mouse 18 of FIG. 1 is analogous to mouse 118 of FIG. 4 and so forth. Thus, data-processing system 110 of FIG. 1 can be adapted for use with the configuration depicted in FIGS. 1-2.

As will be described in detail below, aspects of the preferred embodiment pertain to specific method steps implementable on computer systems. In an alternative embodiment, the invention may be implemented as a computer program-product for use with a computer system, which can be implemented as devices such as networked computer workstations, computer desktop and peripheral devices, servers and the like. The programs defining the functions of the preferred embodiment can be delivered to a computer via a variety of signal-bearing media, which include, but are not limited to, (a) information permanently stored on non-writable storage media (e.g., read-only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of one or more embodiments of the present invention, and/or represent alternative embodiments of the present invention.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention what is claimed is:

1. A method, comprising:
provided an imaging data stream language encompassing print command languages in which a plurality of objects to be rendered are divided into a plurality of categories, wherein each object among said plurality of objects are utilized in association with a plurality of callouts, wherein said imaging data stream language comprises a Line Conditioned Data Stream (LCDS) language; and
processing each object among said plurality of objects separately from each callout among said plurality of callouts, thereby permitting any of said objects among said plurality of objects to be utilized with any callout among said plurality of callouts in order to efficiently render said plurality of objects utilizing said imaging data stream language.

2. The method of claim 1 wherein processing each object among said plurality of objects separately from each callout among said plurality of callouts, further comprises:
processing at least one object among said plurality of objects independently of each callout among said plurality of callouts in order to determine a plurality of standard attributes thereof, wherein said plurality of attributes are determined based on at least one object type.

3. The method of claim 2 wherein at least one standard attribute among said plurality of attributes comprises a natural size of said at least one object of said at least one object type.

4. The method of claim 2 wherein at least one standard attribute among said plurality of attributes comprises a natural orientation of said at least one object of said at least one object type.

5. The method of claim 2 wherein processing each object among said plurality of objects separately from each callout among said plurality of callouts, further comprises:
processing each callout among said plurality of callouts separately from each object among said plurality of objects utilizing said plurality of attributes associated with an object among said plurality of objects in order to determine place and size data for each callout thereof.

6. The method of claim 5 wherein at least one callout among said plurality of callouts comprises a form callout.

7. The method of claim 5 wherein at least one callout among said plurality of callouts comprises an image callout.

8. The method of claim 5 wherein at least one callout among said plurality of callouts comprises a logo callout.

9. The method of claim 1 further comprising rendering said at least one object among said plurality objects utilizing an electronic document processing system.

10. The method of claim 9 wherein said electronic document processing system comprises a computer workstation associated with a rendering device utilizing a computer network.

11. A system, comprising:
an imaging data stream language in which a plurality of objects to be rendered are divided into a plurality of categories, wherein each object among said plurality of objects are utilized in association with a plurality of callouts, wherein said imaging data stream language comprises a Line Conditioned Data Stream (LCDS) language; and
a PDL decomposer for processing each object among said plurality of objects separately from each callout among said plurality of callouts, thereby permitting any of said objects among said plurality of objects to be utilized with any callout among said plurality of callouts in order to efficiently render said plurality of objects utilizing said imaging data stream language.

12. The system of claim 11 wherein said processor processes at least one object among said plurality of objects independently of each callout among said plurality of callouts in order to determine a plurality of standard attributes thereof, wherein said plurality of attributes are determined based on at least one object type.

13. The system of claim 12 wherein at least one standard attribute among said plurality of attributes comprises a natural size of said at least one object of said at least one object type.

14. The system of claim 12 wherein at least one standard attribute among said plurality of attributes comprises a natural orientation of said at least one object of said at least one object type.

15. The system of claim 12 wherein said processor processes each callout among said plurality of callouts separately from each object among said plurality of objects utilizing said plurality of attributes associated with an object among said plurality of objects in order to determine place and size data for each callout thereof.

16. The system of claim 15 wherein at least one callout among said plurality of callouts comprises a form callout.

17. The system of claim 15 wherein at least one callout among said plurality of callouts comprises an image callout.

18. The system of claim 15 wherein at least one callout among said plurality of callouts comprises a logo callout.

19. A system, comprising:
an imaging data stream language in which a plurality of objects to be rendered are divided into a plurality of categories, wherein each object among said plurality of objects are utilized in association with a plurality of callouts, wherein said imaging data stream language comprises a Line Conditioned Data Stream (LCDS) language; and
a processor for processing each object among said plurality of objects separately from each callout among said plurality of callouts, wherein said processor processes at least one object among said plurality of objects independently of each callout among said plurality of callouts in order to determine a plurality of standard attributes thereof, wherein said plurality of attributes are determined based on at least one object type, thereby permitting any of said objects among said plurality of objects to be utilized with any callout among said plurality of callouts in order to efficiently render said plurality of objects utilizing said imaging data stream language; and
a rendering device, which communicates with said processor, for rendering said at least one object among said plurality objects utilizing an electronic document processing system, wherein said electronic document processing system comprises a computer workstation associated with a rendering device utilizing a computer network.

20. The system of claim 19 wherein at least one standard attribute among said plurality of attributes comprises a natural size of said at least one object of said at least one object type or a natural orientation of said at least one object of said at least one object type.

21. The system of claim 20 wherein said processor processes each callout among said plurality of callouts separately from each object among said plurality of objects utilizing said plurality of attributes associated with an object among said plurality of objects in order to determine place and size data for each callout thereof.

22. The system of claim 21 wherein at least one callout among said plurality of callouts comprises a form callout, an image callout and/or a logo callout.

* * * * *